United States Patent [19]

Romey et al.

[11] 4,410,646
[45] Oct. 18, 1983

[54] FORM MASSES FROM THERMOPLASTIC SYNTHETIC MATERIALS AND RESIDUES OF COAL HYDROGENATION

[75] Inventors: Ingo Romey, Hünxe, Fed. Rep. of Germany; Menachem El-Roy, Haifa, Israel

[73] Assignee: Bergwerksverband GmbH, Essen, Fed. Rep. of Germany

[21] Appl. No.: 380,009

[22] Filed: May 19, 1982

Related U.S. Application Data

[63] Continuation of Ser. No. 280,512, Jul. 6, 1981, abandoned, which is a continuation of Ser. No. 75,742, Oct. 29, 1979, abandoned.

[51] Int. Cl.$^3$ ............................................. C08L 95/00
[52] U.S. Cl. ......................................... 524/65; 524/60
[58] Field of Search .................................... 524/60, 65

[56] References Cited

U.S. PATENT DOCUMENTS

| | | | |
|---|---|---|---|
| 3,859,238 | 1/1975 | Kremser et al. | 260/28.5 |
| 3,873,483 | 3/1975 | Oelsner et al. | 260/33.6 |
| 4,008,095 | 2/1977 | Fukushima et al. | 260/28.5 |
| 4,028,293 | 6/1977 | van den Berg | 260/28.5 |
| 4,204,986 | 5/1980 | Romey et al. | 524/65 |

*Primary Examiner*—Melvyn I. Marquis
*Attorney, Agent, or Firm*—Michael J. Striker

[57] ABSTRACT

Synthetic form masses are described which are derived from thermoplastic polyolefins as well as mixed and copolymerisates thereof and a coal liquification product. The coat liquification product is a residue which precipitates out during extractive hydrogenation and has a softening point between 70° and 200° C. The thermoplastic polyolefin contains a component of polar, aromatic or cyclic monomers, which improve the compatibility of the components in the mixture. The form masses from this mixture, which may include filler material, have excellent tear resistance properties.

9 Claims, No Drawings

FORM MASSES FROM THERMOPLASTIC SYNTHETIC MATERIALS AND RESIDUES OF COAL HYDROGENATION

This is a continuation of application Ser. No. 280,512, filed July 6, 1981, which is a continuation of application Ser. No. 075,742 filed Oct. 29, 1979 both abandoned.

BACKGROUND OF THE INVENTION

The invention concerns form masses which are derived from thermoplastic mixtures of polyolefins as well as mixed and copolymerisates thereof which contain polar, aromatic or cyclic monomers and of liquification products from coal as well as customary filler materials.

Through a hydrogenation of coal in oil suspensions under high pressure and at elevated temperatures, mostly liquid compounds are obtained. After a separation at atmospheric pressure of the products boiling above 200° C. to about 350° C., a meltable residue is obtained which also contains as impurities ash, umreacted coal and catalyst. The softening point of this residue lies between 70° and 200° C. according to German technical specification DIN 1995, corresponding to the variable content of non-melting material. This residue is characterised by a large number of condensed rings and a high aromaticity. Such residues may be obtained through known coal hydrogenation processes, such as for example the Pott-Broche process or the Bergius-Pier process.

Form masses of the type noted above can be pressed, poured or extruded in customary preparation machines. They are used for example in the building and installation sector for conduits, profiles, and containers as well as for sealing and protection purposes, such as in the form of foils for protection against water.

Form masses from synthetic plastic mixtures with bitumen are known for example from DE-AS 24 41 203. They are essentially comprised of ethylenecopolymerisates and an extract- or precipitate bitumen, which have a penetration at 25° C. less than 10 according to German technical specification 1995. The softening point of these bitumina lies under 63° C.

Also in DE-AS No. 17 20 169 is a mixture of bitumen and mixed polymerisates described, in which the bitumen has a softening point under 63° C., in order that they might be miscible with block mixed polymers of butadiene and styrene.

In contrast, the DE-AS 11 85 372 shows that bitumina with a softening point of 190°–200° C. are only 20% miscible with polyolefins. When copolymers with a high content of vinyl acetate, for example 60 weight-%, are present in the synthetic plastic, bituminous coal tar pitch with a softening point of 160° C. can be added up to 40 weight-% of the total mixture (DE-AS 21 48 186).

Finally, in German application P 28 01 154.3 mixtures are described of thermoplastic synthetic plastics, in particular polyolefins and copolymers thereof, as well as if desired elastomers with thermoplastic properties and filler materials, and in addition products boiling at normal pressure over 350° C. before mixing with the synthetic plastic from the liquification products of coal. Thus, this component is a high-melting residue from coal hydrogenation.

DESCRIPTION OF THE INVENTION

It is an object of the invention to make miscible with synthetic plastics the greatest possible amount of hydrogenation residue. It is also an object to prepare a product which can be formed, pressed, injected and extruded with conventional plastics manufacturing equipment.

This is achieved through the invention by using in the mixture the coal liquification product from extractive coal hydrogenation, the precipitated residue with a softening point from 70° to 200° C., preferably from 120° to 200° C. according to German technical specification DIN 1995.

Further preferred parameters of the invention are as follows:

(a) The residue may contain up to 33 weight-% solid, non-melting substances; or, alternatively (b) the coal hydrogenation product is free of solid, non-melting substances;

(c) the polyolefins have a melt index MFI 190/2.5 of 0.1 to 1.7 g/10 min;

(d) in the copolymerisate the portion of polar monomers is between 10 and 80 weight-% and the softening point of which according to DIN 1995 lies between 70° and 190° C.; and (e) with an increase of the portion of polar, aromatic and/or cyclic monomers from 5 to 30 weight-% the filler material component also can rise up to 40 weight-%, calculated from the total form mass.

It has been surprisingly found that the precipitating liquification product from extractive hydrogenation of coal as a residue with a softening point of 70° to 200° C. according to DIN 1995 can be mixed in amount from 20 to 45 weight-% of the total mixture with a polyolefinic polymerisate and nonetheless tear resistances of not less than 10 N/mm$^2$ and tear elongations of not less than 100% can be obtained. Such values have until now not been achieved with a bitumen addition to polyolefins.

Suitable polyolefins are for example high-pressure polyethylene (HP-polyethylene) of lower density, polypropylene or copolymers of ethylene and propylene. Polar copolymers can contain for example vinyl acetate, vinyl chloride or acrylonitrile groups. Aromatic copolymers can for example contain styrene or homologues thereof, and the cyclic copolymers, terpenes with olefins and dienes, such as ethylidene norbonene.

It has further been found that mixed polymerisates of butadiene and polar monomers, for example acrylonitrile, or aromatic monomers, such as styrene, lead to high tear elongations in the obtained polyolefin-residue mixtures, while mixed polymers with vinyl chloride as monomer components lead to a heightening i.e. increase, of the tear resistance. The vinyl acetate monomers lead to a simultaneous sinking i.e. decrease, of the tear resistance and tear elongation. Through a corresponding dosage of the above mixed polymers into the synthetic plastic mixture one may obtain a broad spectrum of tear resistance and tear elongations. In this manner, with synthetic plastics mixtures with 20 to 45 weight-% residue tear resistances between about 10 and 20 N/mm$^2$ and tear elongations between 100 and 600% can be obtained. With a residue component in the synthetic plastic mixture of only 10 to 20 weight-%, the tear elongation rises to 670% and higher, while with 50 to 70 weight-% residue the elongation drops to about 20%. Such a great flexibility in the preparation of form masses from thermoplastic synthetics and carbon-containing materials, including pitch, asphalt, bitumina or coal liquification products, has not until now been described.

In addition, the polar and/or aromatic monomers of the mixed polymerisates have a great influence on the compatibility of the synthetic plastics with filler material in the form mass, such as anthracite powder. Thus, the filler material content can be raised to up to 40 weight-% of the form mass, while the polymer component is only 21 to 35 weight-%, if the amount of monomer with polar and/or atomatic groups reaches 8 to 14 weight-% and more in the total form mass.

Depending upon the content of the residue from the coal hydrogenation in solid, non-melting substances, i.e., undissolved coal components, minerals and in some cases catalysts, an addition of customary filler materials, such as for example soot, anthracite dust, chalk, and ground stone, is possible.

The separation of the solid, non-melting substances from the residue according to the invention may be desired in some cases for the preparation of form masses, which are required to possess special properties, such as high plasticity. The separation can be carried out in conventional manner, such as through pressure filtration.

From the form masses, form bodies, foils and other products can be obtained after mixing and if desired kneading of the components at temperatures between 140° and 190° C. with customary apparatus, primarily extruders or injection mold machines.

The invention may be better understood through the following examples.

EXAMPLES

The residue according to the invention from the liquification of coal, with a softening point from 70° to 200° C. according to DIN 1995 is prepared for example according to the following method:

From gas flame coal ground to a size below 200 μm, an autoclave is filled along with a heavy oil anthracene oil and a catalyst (cobalt-molybdenum). Depending on the characteristics of the desired residue, more or less hydrogen, either in gaseous form or in the form of a hydrogen-donating oil, is added. At high pressures of between about 100 to 700 bar and at temperatures between about 400° and 500° C. the coal is liquified. After a reaction time of 2 to 3 hours the autoclave is cooled and the reaction mixture removed. Then the products which boil over 350° C. at normal pressure are separated out and one obtains as residue an inventive product with a softening point of 129° C. according to DIN 1995.

The following table shows the flexibility in the preparation of form masses and the thereby-achieved variations in tear resistance and tear elongation in test bodies in tests according to German technical specification DIN No. 53 455.

| Example | | | Weight % | Tear resistance N/mm$^2$ | Tear elongation % | Remarks |
|---|---|---|---|---|---|---|
| 1. | (a) | Residue, SP = 129° C. | 30 | | | Polypropylene without polar groups |
| | (b) | Polypropylene SI = MFI 190/2.5 = 0.1 9/10 min | 70 | 14 | 110 | |
| 2. | (a) | Residue, SP = 129° C. | 20 | | | High tear resistance through addition of VC |
| | (b) | Ethylene-vinyl acetate-vinyl chloride mixed polymer (51% VC; 31% VA; 18% PE) | 80 | 21 | 260 | |
| 3. | (a) | Residue, SP = 129° C. | 30 | | | |
| | (b) | Ethylene-vinyl acetate-vinyl chloride mixed polymer (51% VC; 31% VA; 18% PE) | 4 | | | |
| | (c) | HP-polyethylene SI = MI 190/2.5 = 0.1–0.3 9/10 min | 66 | 10 | 213 | |
| 4. | (a) | Residue, SP = 129° C. | 30 | | | Vinyl actate mixed polymer with low VA-content |
| | (b) | Ethylene-vinyl acetate-copolymer (SP = 95°C.) | 50 | | | |
| | (c) | HP-polyethylene SI = MFI 190/2.5 = 0.1–0.3 g/10 min | 20 | 9.5 | 213 | |
| 5. | (a) | Residue, SP = 129° C. | 45 | | | High residue content Low polar content |
| | (b) | Ethylene-vinyl acetate-copolymer (60% VA) SP = 100° C. | 7.5 | | | |
| | (c) | HP-polyethylene SI = MFI 190/2.5 = 0.1–0.3 g/10 min | 47.5 | 10 | 100 | |
| 6. | (a) | Residue, SP = 120° C. | 40 | | | High tear elongation |
| | (b) | Ethylene-vinyl acetate-copolymer (SP = 92° C.; VA = 15%) | 60 | 5 | 600 | |
| 7. | (a) | Residue, SP = 129° C. | 22 | | | High tear elongation, medium tear resistance |
| | (b) | Ethylene-vinyl acetate-copolymer (SP = 72° C.; 125% VA) | 60 | | | |
| | (c) | HP-polyethylene SI = MFI 190/2.5 = 0.1–0.3 | 18 | 10 | 600 | |

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Form mass, comprising
   (a) thermoplastic material mixtures of polyolefins and/or olefin copolymers which contain polar, aromatic or cyclic monomers and
   (b) liquefaction products of coal and
   (c) where appropriate conventional fillers, wherein said liquefaction product is a residue occurring in extractive coal hydrogenation with a softening point of from 70° to 200° C., according to DIN (German Industrial Standard) 1995.
2. Form mass according to claim 1, wherein said softening point is from 120° to 200° C.
3. Form mass according to claim 1, wherein said residue contains up to 33% by weight of solid, non-melting substances.
4. Form mass according to claim 1, wherein said residue is freed of solid, non-melting substances.
5. Form mass according to claim 1, wherein said polyolefins have a melt index MFI 190/2.5 of from 0.1 to 1.7 g/10 min.
6. Form mass according to claim 1, wherein said copolymerizates have a proportion of polar monomers between 10 and 80% by weight and their softening point is between 70° and 190° C. according to DIN 1995.
7. Form mass according to claim 1, wherein as the proportion of said polar, aromatic and/or cyclic monomers increases from 5 to 30% by weight the proportion of filler also increases up to 40% by weight, relative to the total form mass.
8. Form mass according to claim 1, wherein said component (a) comprises mixed polymerizates of butadiene and polar or aromatic monomers.
9. Form mass according to claim 1, wherein said component (a) comprises mixed polymerizates with vinyl chloride as the monomer constituent.

* * * * *